United States Patent [19]

Balsley et al.

[11] Patent Number: 4,597,260
[45] Date of Patent: Jul. 1, 1986

[54] OXYGEN STARTING ASSIST SYSTEM

[75] Inventors: Rollin B. Balsley, Union Lake; Daniel J. Morrill, Milford, both of Mich.

[73] Assignee: Williams International Corporation, Walled Lake, Mich.

[21] Appl. No.: 754,994

[22] Filed: Jul. 15, 1985

Related U.S. Application Data

[63] Continuation-in-part of Ser. No. 255,313, Apr. 17, 1981, abandoned.

[51] Int. Cl.⁴ .................. F02C 7/262; F02C 7/266
[52] U.S. Cl. .................................. 60/39.827; 313/120
[58] Field of Search ........... 60/39.821, 39.826, 39.827; 313/120

[56] References Cited

U.S. PATENT DOCUMENTS

| 2,465,092 | 3/1949 | Harkness et al. | 60/39.827 |
| 2,493,743 | 1/1950 | Benson | 60/39.827 |
| 2,693,082 | 11/1954 | Arthur | 60/39.827 |
| 2,784,553 | 3/1957 | DeCorso et al. | 60/39.826 |
| 2,831,993 | 4/1958 | Lentz | 60/39.827 |
| 3,330,985 | 7/1967 | Johnston | 60/39.827 |
| 4,215,979 | 8/1980 | Morishita | 60/39.827 |

FOREIGN PATENT DOCUMENTS 587564 4/1947 United Kingdom ............ 60/39.827

Primary Examiner—Carlton R. Croyle
Assistant Examiner—Jeffrey A. Simenauer
Attorney, Agent, or Firm—Lyman R. Lyon

[57] ABSTRACT

An oxygen starting assist system for a gas turbine engine which facilitates lighting or relighting the air-fuel of the engine comprising a tubular element surrounding the spark plug that directs pure oxygen to the tip of the spark plug so as to envelop an arc drawn by the spark plug without passing through the arc.

1 Claim, 3 Drawing Figures

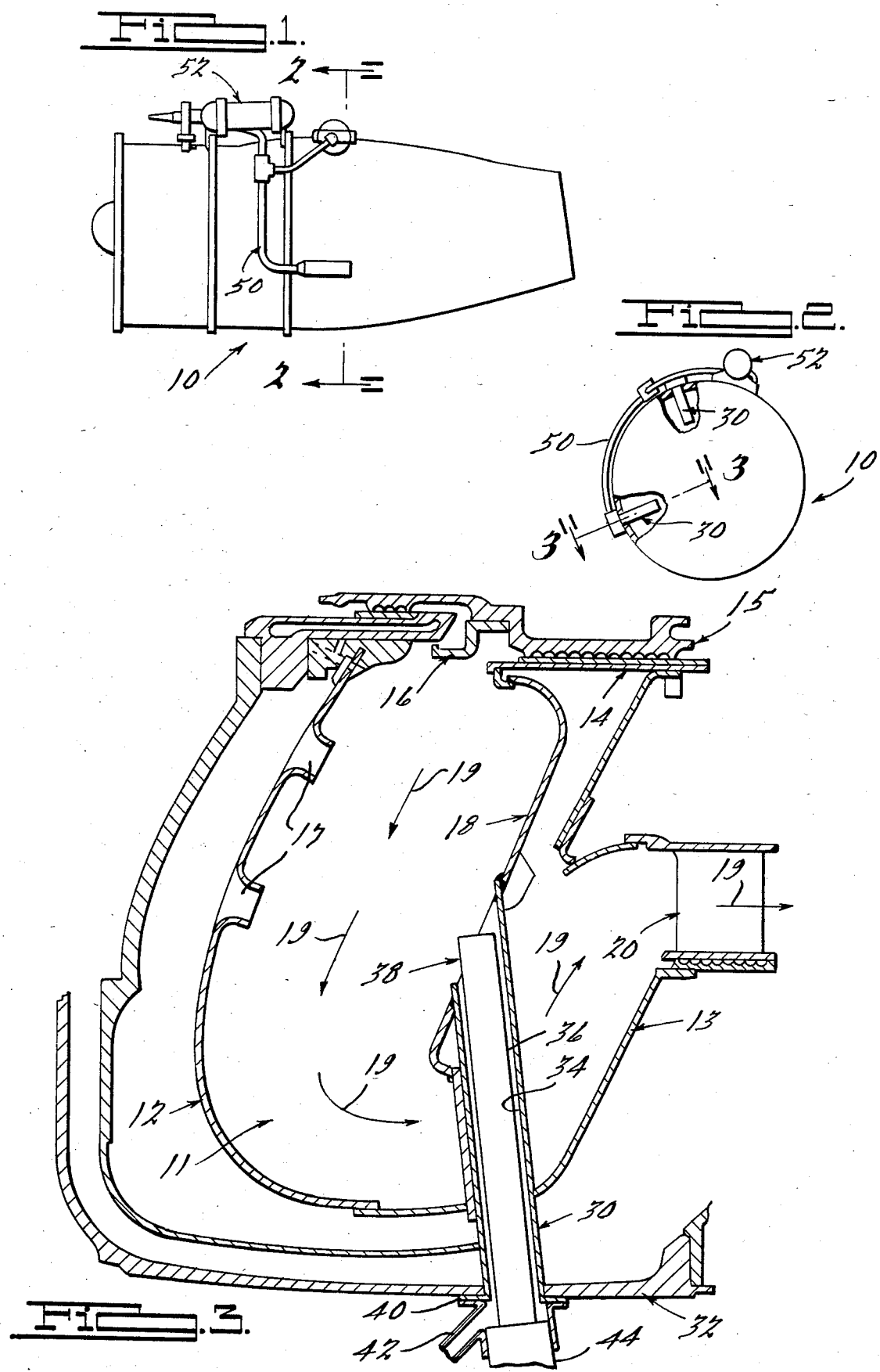

OXYGEN STARTING ASSIST SYSTEM

LICENSE RIGHTS

The U.S. Government has a paid-up license in this invention and the right in limited circumstances to require the patent owner to license others on reasonable terms as provided for by the terms of Contract No. N00019-78-C-0206 awarded by Department of Navy, Joint Cruise Missile Program.

CROSS REFERENCE TO RELATED APPLICATION

This application is a continuation-in-part of U. S. application Ser. No. 255,313 filed Apr. 17, 1981, now abandoned.

BACKGROUND OF THE INVENTION

1. Field of the Invention

The invention relates to gas turbines, and more particularly to a system for igniting the fuel-air mixture in the combustion chamber of a gas turbine at high altitude in which environment combustion is sometimes difficult to initiate due to lack of oxygen, transient disturbances in the flow of working fluid, depressed temperatures, etc.

2. Description of the Prior Art

A number of attempts have been made to solve the aforementioned problem. For example, Johnston U.S. Pat. No. 3,330,985 discloses an igniter wherein gas flows internally thereof between a central solid electrode and a surrounding tubular electrode to cool the electrodes and enhance projection of the spark arc. However, this technique precludes the use of surface gap spark plug having a semi-conductor bridging the gap between the electrodes. Moreover, high velocity gas flow through the arc introduces the possibility of spark blow out.

Similarly, the patent to Harkness et al U.S. Pat. No. 2,465,092 teaches flow of air between the electrodes across the spark gap. Both of the aforesaid teachings have the potential liability that fluid flow through the arc may extenguish the arc rather than enhancing spark promulgation.

The patent to Morishita U.S. Pat. No. 4,215,979 teaches the induction of pressurized air into an annulus between an igniter and a shroud where it is admixed with pressurized gaseous fuel. The Morishita device functions to produce a turbulent mixture of air and fuel for introduction to the arc drawn by the igniter.

The patent to DeCorso U.S. Pat. No. 2,784,553, like Morishita, blows an air-fuel mixture past an igniter to effect ignition of said mixture which torches into the combustion chamber.

The patent to Lentz U.S. Pat. No. 2,831,993 discloses a shrouded igniter wherein air is inducted into a passage surrounding the igniter to effect cooling thereof under certain conditions. Lentz is useful only for a teaching that airflow patterns are capable of blowing an air-fuel mixture away from the area wherein ignition occurs.

BRIEF SUMMARY OF THE INVENTION

The present invention relates to an improved technique for utilizing pure oxygen to aid in lighting jet engine burners at high altitude. Ignition accomplished by utilizing a separate source of pure oxygen and a conduction system therefor that conducts the oxygen in substantially non-turbulent flow to the area surrounding the arc rather than forcing a gas flow to or through the arc drawn between electrodes of the igniter. More particularly, a tubular shroud having a smooth cylindrical inner surface surrounds the entire cylindrical spark plug in spaced coaxial relationship thereto so as to direct a hollow column of oxygen to the area surrounding the tip of the spark plug whereby pure oxygen itself surrounds the arc as opposed to feeding the arc with fuel or projecting the arc. Since the oxygen is supplied via a shroud surrounding the spark plug rather than through the plug itself and its spark gap, the present invention has the advantage that it is applicable to the surface gap type spark plug wherein a semi-conductor is used to bridge the gap between the center electrode and the grounded shell. The use of this type of igniter has the advantage that a lower voltage, for example 3800 volts, is adequate to initiate the spark instead of the 10,000 to 15,000 volts required to fire an air gap type plug. The lower voltage requires less insulation to prevent flash over in the high voltage cabling and connections which is of particular importance for high altitude starting. Moreover, the present invention is relatively resistant to fouling.

The invention is particularly suited to a twin spool fanjet with an annular combustor wherein fuel is introduced via a rotating slinger. However, the concept of feeding pure supplemental oxygen through a shroud surrounding the igniter plug is applicable to any combustor having a substantially cylindrical igniter plug.

It is an object of the present invention to provide an improved oxygen assist starting system for a gas turbine combustion chamber which facilitates ignition in a reliable yet economical manner, and minimizes the risk of failure.

It is another object to provide an improved oxygen assist starting system which may be utilized with presently existing designs of combustion chambers having an igniter plug.

Other objects, features and advantages of the present invention will become apparent from the following description, the appended claims and the accompanying drawings.

BRIEF DESCRIPTION OF THE DRAWINGS

FIG. 1 is a side elevation of a jet engine having the oxygen assist start system of the present invention;

FIG. 2 is a fragmentary view taken generally along the line 2—22 of FIG. 1; and

FIG. 3 is an enlarged fragmentary cross-sectional view taken generally along the line 3—3 of FIG. 2.

DETAILED DESCRIPTION OF THE PREFERRED EMBODIMENT OF THE INVENTION

A gas turbine 10 comprises a combustion chamber 11 having a forward wall portion or cover 12 and a rear segment or outer wall 13. A sleeve 14 surrounds the high pressure turbine shaft 15 which carries a rotating fuel distributor 16 which supplies liquid fuel to the combustion chamber 11. Compressed air is supplied through a plurality of orifices 17 in the wall 12 of the combustion chamber 11 from a compressor section of the engine 10, not shown. An inner wall or primary plate portion 18 extends between the walls 12 and 13 to direct the flow of the air-fuel mixture and combustion gases, as shown by the arrows 19, to a first stage turbine nozzle 20.

In accordance with the present invention, an oxygen starting assist system comprises a tubular element or shroud 30 that extends through an outer case or diffuser assembly 32 of the combustion chamber 11 as well as through the rear segment 13 and primary plate 18. The tubular element 30 has a smooth cylindrical I.D. 34 slightly larger than the cylindrical outer wall 36 of an igniter 38. The igniter 38 is conventional in construction and comprises one or more electrodes (not shown) spaced radially inwardly of the outer wall 36 at the inner end or tip thereof. An upper flange 40 on the tubular element 30 is seated against the outer case 32, an oxygen inlet fitting 42 being secured thereto as well as to an enlarged portion 44 of the igniter 38 in fluid sealing relationship.

To facilitate starting on relight of the engine 10, pure oxygen is admitted to the tubular element 30 through the fitting 42. Oxygen flows longitudinally of the tubular element 30 without passing through valves, barriers, or orifices resulting in substantially non-turbulent flow between the inner wall 34 thereof and the igniter 38, exiting adjacent the tip of the igniter 38.

In this manner a hollow column of pure oxygen exiting the element 30 flows past the tip of the igniter 38 but not through the electrodes thereof whereby an oxygen shroud surrounds an arc drawn by the igniter 38 thereby to facilitate, in the manner taught by the instant invention, ignition of the air-fuel mixture within the combustion chamber 11.

As seen in FIG. 2, a tubular element 30 may be provided for each of the igniters 38 of the engine 10, a common manifold 50 supplying the tubular elements from a flask 52 of pure oxygen. Control of oxygen flow is by a conventional solenoid operated valve, not shown.

From the foregoing description, it should be apparent that the oxygen starting assist system of the instant invention is simple in construction, relatively light weight, and positive in operation. A hollow column or shroud of pure, flowing oxygen is directed to a precise location spaced radially outwardly of both of the electrodes across which a spark is drawn yet admits the normal air-fuel mixture to the igniter. Thus, ignition is facilitated without requiring manipulation of the air-fuel mixture or projection of flow of oxygen or air-fuel mixture through the arc.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. An oxygen starting assist system for facilitating ignition of the normal air-fuel charge in the combustion chamber of a jet engine, said system comprising
   a flask of pure oxygen,
   a cylindrical igniter extending into the combustion chamber of the engine having means at an inner end thereof for drawing an electrical arc,
   a tubular element having a smooth imperforate cylindrical inner wall substantially coextensive with said igniter and disposed in radially outwardly spaced coaxial relation to a central axis thereof so as to define an uninterrupted cylindrical oxygen passage therebetween, and
   conduit means connecting said oxygen flask with the cylindrical oxygen passage between said element and said igniter whereby a hollow column of pure oxygen is conducted past the inner end of said igniter so as to surround an arc generated by said igniter without flowing through said arc.

* * * * *